United States Patent
Watanabe

[19]

[11] Patent Number: 6,008,919
[45] Date of Patent: Dec. 28, 1999

[54] OPTICAL RECEIVING APPARATUS

[75] Inventor: Nobutaka Watanabe, Tokyo, Japan

[73] Assignee: NEC Corporation, Tokyo, Japan

[21] Appl. No.: 08/813,432

[22] Filed: Mar. 10, 1997

[30] Foreign Application Priority Data

Mar. 8, 1996 [JP] Japan .................................. 8-051207

[51] Int. Cl.⁶ .................................................. H04J 14/02
[52] U.S. Cl. ........................................ 359/124; 359/189
[58] Field of Search ...................................... 359/124, 189

[56] References Cited

U.S. PATENT DOCUMENTS 5,745,270   4/1998   Koch ........................................ 359/124

FOREIGN PATENT DOCUMENTS

| 327663 | 12/1993 | Japan . |
| 222234 | 8/1994 | Japan . |
| 350531 | 12/1994 | Japan . |
| 18536 | 1/1996 | Japan . |

*Primary Examiner*—Thomas Mullen
*Attorney, Agent, or Firm*—Sughrue, Mion, Zinn, Macpeak & Seas, PLLC

[57] ABSTRACT

It is the object of the invention to provide an optical signal receiving apparatus, which is used in a narrow band WDM optical transmission system, and never misguidedly receives an adjacent optical signal, when an optical signal to be received is down. An optical signal to be received is extracted from plural WDM optical signals by an optical BPF, a central wavelength of which coincides with the wavelength of the optical signal to be received, and converted into an electrical signal by the O/E converter. A tone-signal extracting circuit extracts the frequency component of the tone-signal, which is superposed on the optical signal with the wavelength equal to the central wavelength of the optical BPF. If the extracted signal level of the tone signal is lower than that of a predetermined standard voltage, a comparator supplies a reset signal to an electrical signal decision circuit. If the optical signal with a desired wavelength is down, the output level of a tone-signal extracting circuit becomes low, and the electrical signal decision circuit is reset. Then, even if the clock signal of the adjacent optical signal is extracted, the adjacent optical signals is not misguidedly discriminated and regenerated by the electrical signal decision circuit.

4 Claims, 4 Drawing Sheets

OPTICAL RECEIVING APPARATUS

FIELD OF THE INVENTION

The invention relates to an optical signal receiving apparatus used in a narrow band wavelength-division-multiplexed (WDM, hereinafter) optical communication system, which transmits and receives plural optical signals having wavelengths that are approximate to each other, and especially to the optical receiving apparatus, in which each of individual optical signals composing the WDM optical signals is extracted therefrom, and information of an extracted optical signal is discriminated and regenerated, based on a clock-signal derived therefrom.

BACKGROUND OF THE INVENTION

In an optical communication system, plural optical signals with different wavelengths, but belonging to the same wavelength-band, such as the 1.3 $\mu$m-band or 1.5 $\mu$m-band, are multiplexed and transmitted through an optical fiber, in order to remarkably improve efficiency of transmission. According to this method of transmission, information of multi-channels can be transmitted through a single optical fiber. An optical communication system in which optical signals are multiplexed in the narrow band of wavelength as mentioned above, is called a narrow-band WDM optical transmission system.

The narrow band WDM optical transmission system is now universally admitted as the most promising system to meet increasing requirements for transmitting extensive information with extremely high bit-rates.

However, in the above mentioned optical transmission system, the spacing of the wavelengths of the adjacent optical signals is so narrow that it is very difficult to prevent interference from the adjacent optical signals, because the adjacent optical signals cannot be satisfactorily attenuated by optical filters at present. For example, if an optical signal is to be received is attenuated, there arises possibility that the adjacent optical signals are received, discriminated, and regenerated by a circuit provided for the optical signal to be received.

SUMMARY OF THE INVENTION

Accordingly, it is an object of the invention to provide an optical receiving apparatus, in which even if the level of an optical signal to be received is attenuated, adjacent optical signals are never misguidedly received by the optical receiver provided for the optical signal to be received.

According to the aforementioned feature of the invention, the optical receiving apparatus comprises:

plural optical filter means for respectively extracting plural individual optical signals from the WDM optical signals, and plural optical receivers respectively corresponding to the individual optical signals, each of which comprising:

optical to electrical signal converting means (O/E converting means, hereinafter) for converting the individual optical signal into an electrical signal;

clock-signal extracting means for extracting a clock-signal component from an output signal of the O/E converting means, means for discriminating and regenerating the output signal of the O/E converting means (electrical signal decision means, hereinafter), based on the clock-signal;

tone-signal extracting means for extracting the tone-signal component from the output signal of the O/E converting means;

comparator means for comparing a level of the tone-signal with a predetermined standard voltage; and means for stopping an operation of the electrical signal decision means, while the comparator means detects that the level of the tone-signal is lower than the predetermined standard voltage.

The features of the inventions shown in later mentioned claims can be summarized as follows.

According to one embodiment of the invention, while an optical signal, the wavelength of which coincides with the central wavelengths of the passing-band of the optical BPF, (the central wavelength of the optical BPF, hereinafter) is received, the tone-signal superposed on the optical signal can be extracted by the tone-signal extracting circuit, where the extracted voltage is higher than the predetermined standard voltage. Consequently, the operation of the electrical signal decision circuit is not stopped, and the optical signal is received. On the other hand, when the optical signal, the wavelength of which coincides with the central wave-length of the optical BPF is down, the adjacent optical signal is received by the O/E converter, although the received signal level is low. Then, there arises the possibility that the clock-signal of the adjacent optical signal is extracted by the clock-signal extracting circuit. However, since the frequency of the tone-signal superposed on the adjacent optical signal is in the outside of the frequency range of the tone-signal extracting circuit, the output signal of the tone-signal extracting circuit becomes lower than the aforementioned standard voltage. Then, even if the clock-signal of the adjacent optical signal is detected, the operation of the electrical signal decision circuit is stopped, and the adjacent optical signal is not misguidedly received.

According to another embodiment of the invention, the tone-signal extracting circuit comprises a BPF for extracting a frequency component of the tone-signal, which is superposed on the optical signal to be received, from the output signal of the O/E converter, and a peak-detecting circuit for detecting the peak value of the output signal of the BPF.

That is to say, the BPF extracts the frequency component of the tone-signal, and the peak detecting circuit detects the peak value thereof, which serves as the output signal of the tone-signal extracting circuit. The output signal corresponding to the maximum value of the amplitude of the extracted tone-signal is obtained by detecting the peak value of the tone-signal, and the output signal voltage thus obtained is easily compared with the aforementioned standard voltage.

According to another embodiment of the invention, means for stopping the operation of the electrical signal decision circuit stops the supply of the clock-signal from the clock-signal extracting circuit to the electrical signal decision circuit, when the output level of the tone-signal extracting means is lower than that of the standard voltage.

That is to say, the operation of the electrical signal decision circuit is stopped by stopping the supply of the clock-signal to the same.

According to another embodiment of the invention, means for stopping the operation of the electrical signal decision circuit supplies a reset signal to the electrical signal decision circuit, when the output signal of the tone-signal extracting circuit is lower than a predetermined standard voltage.

That is to say, the operation of the electrical signal decision circuit is stopped by the reset signal.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical receiving apparatus according to the invention in the preferred embodiments, the aforementioned conventional optical receiving apparatus will be described referring to FIGS. 1 to 2.

Figure 1:
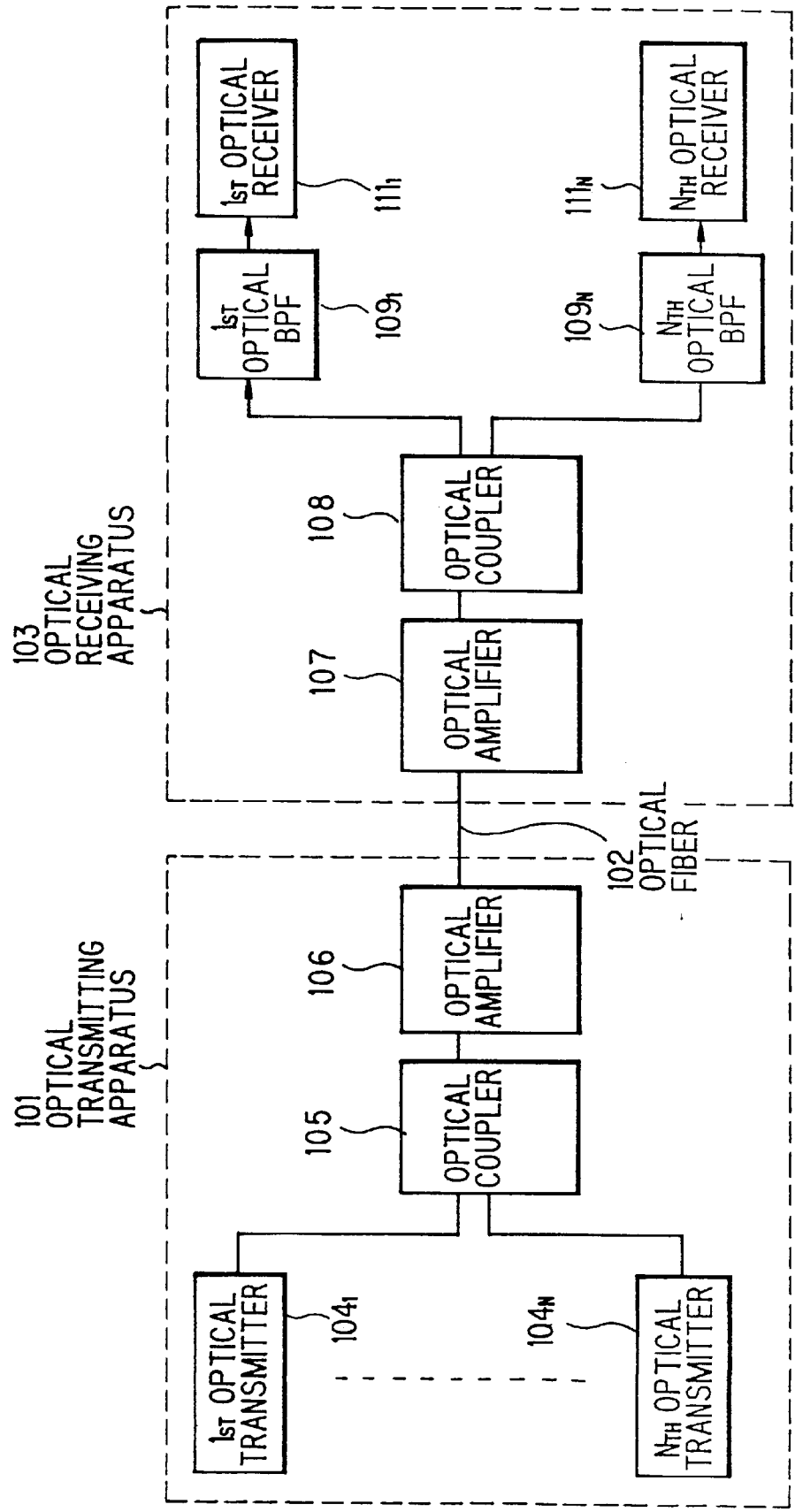
FIG. 1 shows an outline of a structure of a narrow band WDM optical transmission system.

FIG. 1 shows the outline of the structure of a conventional narrow-band WDM optical transmission system. The system is composed of an optical transmitting apparatus 101 for multiplexing and transmitting plural optical signals with different wavelengths, but belonging to the same band of wavelength, an optical fiber 102 for propagating the optical signals supplied from the optical transmitting apparatus 101, and an optical signal receiving apparatus 103, in which each of individual optical signals is extracted by means of an optical band-pass-filter (BPF, hereinafter).

An optical transmitting apparatus 101 is composed of N optical transmitters $104_1$ to $104_N$ for transmitting N optical signals with wavelengths that are different from each other, an optical coupler 105 for multiplexing the optical signals supplied from the optical transmitters $104_1$ to $104_N$, and an optical amplifier 106 for amplifying the multiplexed optical signals up to predetermined signal levels. The optical signals supplied from the optical signal transmitters 104 are intensity-modulated by digital information signals that are to be transmitted.

An optical receiving apparatus 103 is composed of an optical amplifier 107 for amplifying optical signals attenuated by transmission loss of an optical fiber 102 up to predetermined signal levels, and an optical coupler 108 for dividing an output light power of the optical amplifier 107 into N light powers. Moreover, the optical receiving apparatus 103 comprises the first to Nth optical BPFs $109_1$ to $109_N$, each of which extracts only an optical signal to be received from N-divided optical powers supplied from the optical coupler 108, and the first to Nth optical receivers $111_1$ to $111_N$, which respectively receive the optical signals extracted by the optical BPFs $109_1$ to $109_N$ and convert them into electrical signals. The optical signals generated by the first to Nth optical transmitters $104_1$ to $104_N$ respectively pass through the optical BPFs $109_1$ to $109_N$.

Figure 2:
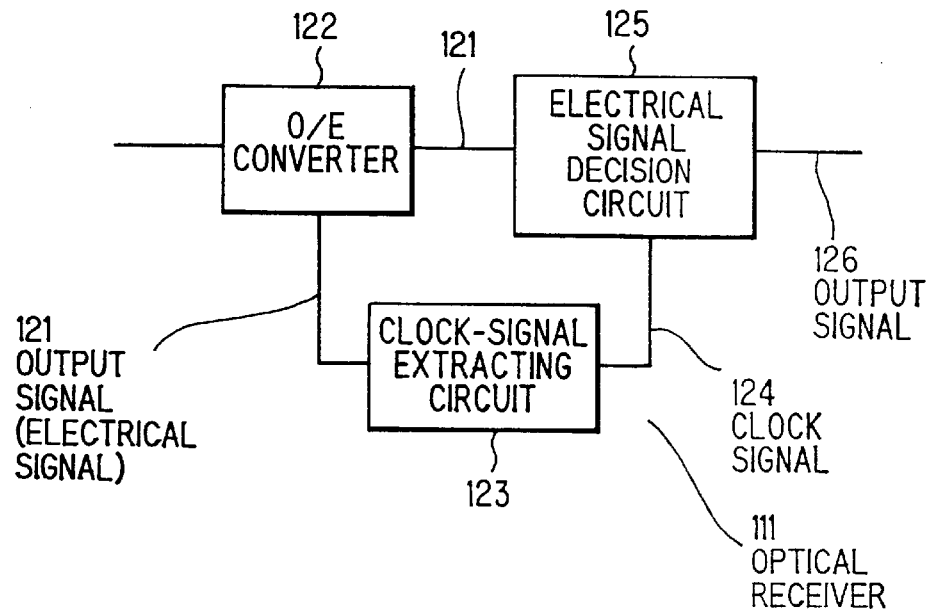
FIG. 2 is a block diagram showing an outline of a structure of a conventional optical receiver.

FIG. 2 shows the outline of the structure of the optical receiver shown in FIG. 1. Since the structures of the N optical receiver $111_1$ to $111_N$ are the same, one of them will be explained referring to FIG. 2. The optical receiver 111 is provided with an O/E converter 122, which receives the output signal of the optical BPF 109 corresponding thereto and converts it into an electrical signal (an output signal) 121. A clock-signal extracting circuit 123 extracts a clock-signal component of the output signal 121 of the O/E converter 122 and generates a clock-signal 124. An electrical signal decision circuit 125 discriminates and regenerates the output signal 121 of the O/E converter 122 by sampling the same by the clock-signal 124.

Each of the optical transmitters 104 generates an intensity-modulated optical signal by a modulating signal, which is square-wave shaped and synchronized with a clock-signal of a predetermined frequency. Although the optical signal generated by the optical transmitter 104 is square-shaped, its form is deformed when it reaches the optical receiving apparatus 103 on account of distortion from propagation through the optical fiber 102. The clock-signal extracting circuit 123 extracts a clock-signal component from the deformed optical signal, and the electrical signal decision circuit 125 regenerates and supplies the square-shaped output optical signal 126 without deformation by sampling the output signal 121 of the O/E converter 122 by the clock-signal 124 obtained in the clock-signal extracting circuit 123.

In the narrow band WDM optical transmission system, the N optical signals are multiplexed and transmitted by the optical transmitting apparatus 101. In the optical receiving apparatus 103, the received optical signals are divided into N equal WDM optical signals by the optical coupler 108. Each of optical BPFs $109_1$ to $109_N$ extracts only an optical signal having a wavelength corresponding to that of an optical receiver 111. Each of the extracted optical signals is converted into an electrical signal, discriminated, and regenerated to be supplied to a next stage. As mentioned in the above, in the narrow band optical transmission system, the optical signals of N channels are simultaneously transmitted through a single optical fiber.

In Japanese Patent Kokai 5-327663, a WDM optical transmission system is disclosed, in which the output levels of the optical transmitters are so controlled that those of the individual optical signals in the WDM ones transmitted from the optical transmitting apparatus keep a constant value. In this system, the plural optical transmitter transmit optical signals, on which sinusoidal signals of low frequencies, being different from each other, are respectively superposed. After these optical signals are multiplexed by an optical coupler, they are amplified by an optical amplifier, and the portions of the amplified optical signals are branched and used as monitoring signals.

The optical signals branched as the monitoring signals are respectively converted into electrical signals by photodiodes, and sinusoidal components, being superposed on the optical signals, are extracted from the output voltages of the photodiodes by plural BPFs corresponding to the respective low frequencies. The output signal levels of the optical transmitters are controlled, based on the signal levels of the corresponding sinusoidal signal components extracted by the BPFs. In this system, since the output optical signal level of the optical transmitter is controlled based on the level of the sinusoidal signal superposed on the optical signal, even when the output level of any one of the optical signals is decreased by any cause, the signal levels of the other optical signals, being free from causes related to the attenuation, can be kept constant.

In the conventional optical receiving apparatus in the narrow band WDM optical transmission system, an optical signal that is to be received is extracted from the WDM optical signals by an optical BPF. Since the transmission characteristic of the optical BPF has a shape of a single peak, an optical signal having a wavelength slightly different from the central wavelength of the optical BPF can pass therethrough to some extent. For example, an isolation characteristic from an adjacent optical signal obtained by the optical BPF is about 15 dB, when the spacing of the wavelengths between the adjacent optical signals is 2 nm. Accordingly, when two optical signals having the wavelength spacing of 1 to 2 nm are multiplexed, cross-talk between them cannot be ignored.

When the optical signal, the wavelength of which coincides with the central wavelength of the optical BPF, is attenuated, a portion of the adjacent optical signal is received by the optical receiver provided for receiving the optical signal being down, although its level is low. If the received signal level of the adjacent optical signal is higher than a certain value, there arises a problem that, the clock-signal of the adjacent optical signal is generated by the clock-signal extracting circuit, and the electrical signal decision circuit misguidedly discriminates and regenerates the adjacent optical signal by the aid of the adjacent clock-signal.

Figure 3:
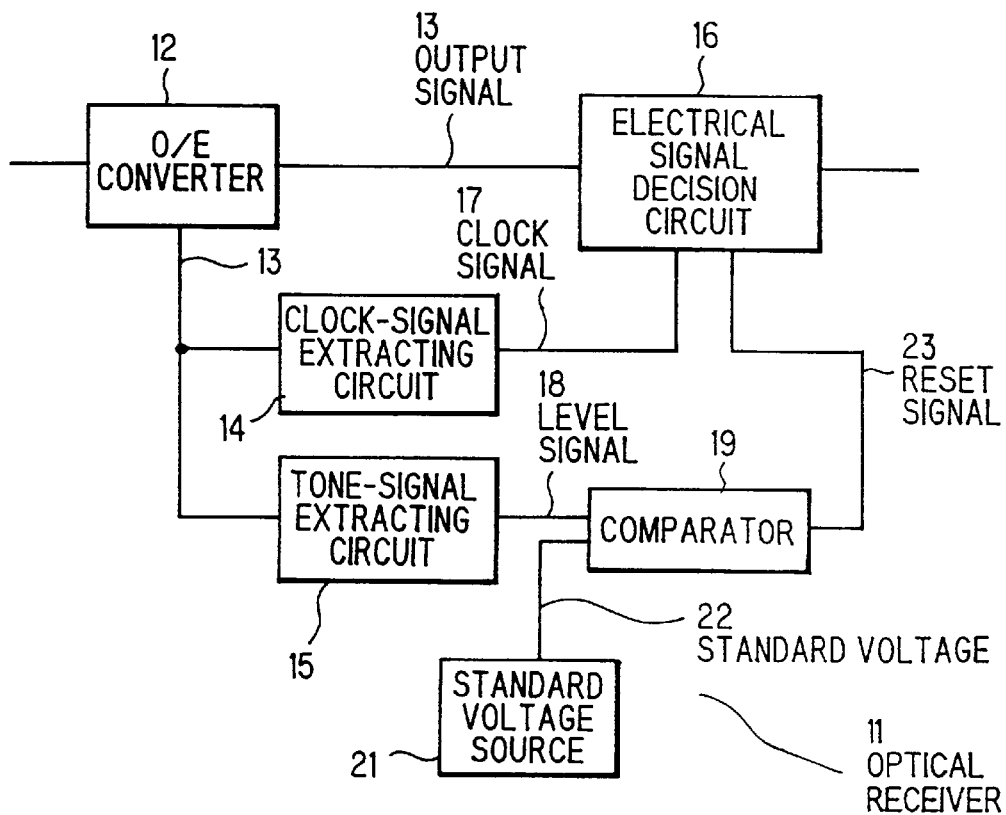
FIG. 3 is a block diagram showing an outline of a structure of an optical receiving apparatus according to the invention as the first preferred embodiment.

FIG. 3 shows the outline of the most important portion of an optical receiving apparatus as a preferred embodiment of the invention. An optical receiver 11 shown in FIG. 3 corresponds to an optical receiver 111 used in a narrow band WDM optical transmission system shown in FIG. 1. An optical signal supplied to the optical receiver 11 is one of the WDM optical signals extracted by an optical BPF. Each of the WDM optical signals is intensity-modulated by an electrical modulating signal, which is expressed as a superposition of digital signals of a predetermined bit-rate and low frequency sinusoidal signals for identifying the wavelength of the optical signal, which are called tone-signals.

In the present case, the bit-rate of each of optical signals is 2.4 Gb/s. The wavelengths of the WDM optical signals belong to the 1550 nm-band, and the WDM optical signals are obtained by multiplexing eight optical signals having the wavelengths of 1548 nm, 1549 nm, 1550 nm, 1551 nm, 1552 nm, 1553 nm, 1554 nm and 1555 nm. The frequencies of the tone-signals respectively superposed on the optical signals are assigned to a frequency range of 30 KHz to 46 KHz at interval of 2 KHz. The modulation factor of the tone-signal is 2 to 3 percent.

The tone-signal of 30 KHz is superposed on the optical signal with a wavelength of 1548 nm, and the frequency of the tone-signal is increased by 2 KHz, whenever the wavelength of the optical signal is increased by 1 nm.

An optical signal supplied to the optical receiver 11 is led to an O/E converter 12, and converted into an electrical signal corresponding to the intensity of the optical signal. The output signal 13 of the O/E converter 12 is respectively supplied to a clock-signal extracting circuit 14, a tone-signal extracting circuit 15 and an electrical signal decision circuit 16. The clock-signal extracting circuit 14 extracts a clock-signal component of the digital signal from the output signal 13 of the O/E converter 12, and generates a clock-signal 17. The tone-signal extracting circuit 15 extracts the frequency component of the tone-signal, which is superposed on the electrical signal supplied from the O/E converter 12, and generates a level signal 18 corresponding to the peak value of the frequency component of the tone-signal. For example, when the optical signal with the wavelength of 1550 nm is received, the tone-signal extracting circuit 15 extracts the tone-signal of 34 KHz.

In the electrical signal decision circuit 16, the output signal of the O/E converter 12 is sampled by the clock-signal 17. The level signal 18 supplied from the tone-signal extracting circuit 15 and a standard voltage 22 supplied from a standard voltage source 21 are led to the comparator 19. The comparator 19 compares the level signal 18 with the standard voltage 22, and generates a reset-signal 23, if the level signal 18 is lower than the standard voltage 22. The electrical signal decision circuit 16 continues the operation for discriminating and regenerating the output signal of the O/E converter 12, when the reset-signal 23 is not supplied thereto, and stops the operation for the same, when the reset-signal 23 is supplied thereto.

Figure 4:
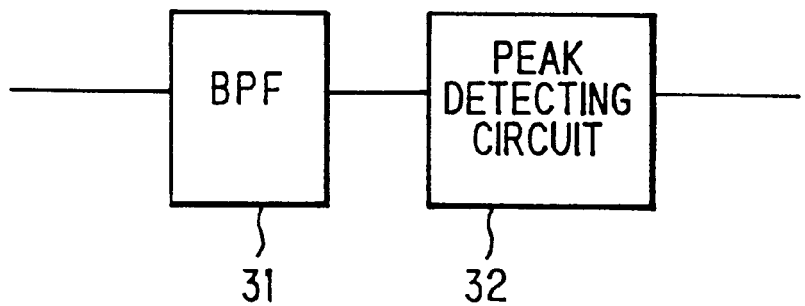
FIG. 4 is a block diagram showing an outline of a structure of a tone-signal extracting circuit shown in FIG. 3.

FIG. 4 shows the outline of the structure of the tone-signal extracting circuit shown in FIG. 3. The tone-signal extracting circuit 15 is composed of a BPF 31, in which the central frequency of the passing band coincides with the frequency of the tone-signal superposed on the optical signal to be received, and a peak detecting circuit 32, which amplifies the output sinusoidal signal of the BPF 31 by a predetermined gain and is provided with a peak detecting circuit for detecting the peak value thereof.

Figure 5:
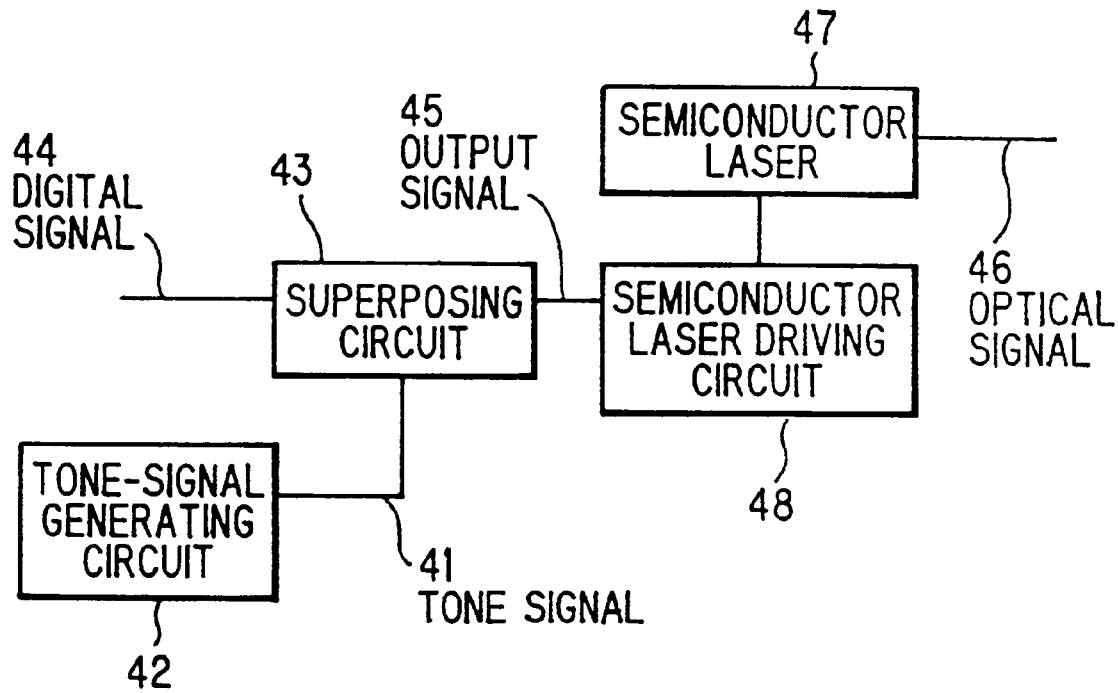
FIG. 5 is a block diagram showing an outline of a structure of an optical transmitting apparatus.
Figure 6:
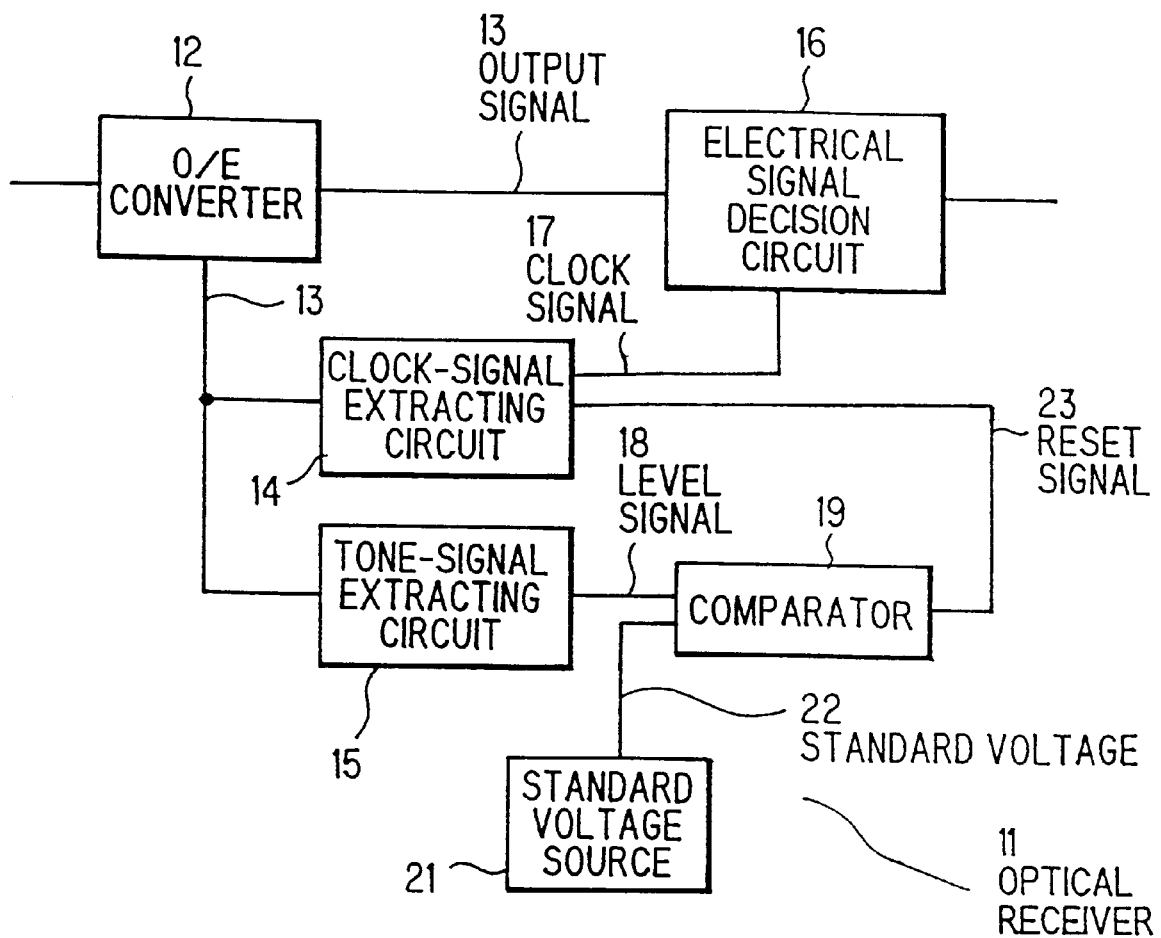
FIG. 6 is a block diagram of an alternative embodiment.

FIG. 5 shows the outline of the structure of the optical transmitter 104 used in the optical transmitting apparatus 101 of the narrow band WDM optical transmission system. The optical transmitter is provided with a tone-signal generating circuit 42 for generating the tone-signal 41, which is a sinusoidal signal with a predetermined frequency. A superposing circuit 43 superposes the tone-signal 41 on the digital signal 44 to be transmitted by modulating the digital signal 44 by the tone-signal 41 with a modulating factor of several percent. The output signal 45 of the superposing circuit 43 is supplied to the semiconductor laser driving circuit 48 for driving the semiconductor laser 47, which generates the optical signal 46.

The semiconductor driving circuit 48 drives the semiconductor laser 47 in accordance with the amplitude of the output signal 45 of the superposing circuit 43. Accordingly, the output signal 46 generated by the semiconductor laser 47 is intensity modulated by the digital signal 44, on which the tone-signal 41 is superposed. By changing the frequency of the tone-signal in accordance with the wavelength of the optical signal, on which the tone-signal is superposed, each of the optical signals of the WDM optical signals has the tone-signal with the frequency peculiar to the optical signal.

When the optical signal to be originally received is supplied to the optical receiver 11 shown in FIG. 3, the tone-signal extracting circuit 15 generates the level signal 18 higher than the standard voltage 22. Subsequently, the reset-signal is not generated by the comparator 19, and the electrical signal decision circuit 16 operates, and a discriminated and regenerated signal can be obtained by the electrical signal decision circuit 16.

When the optical signal to be originally received is attenuated, the other optical signal with the adjacent wavelength passes through the optical BPF and is supplied to the O/E converter 12, although its signal level is low. Then, the O/E converter 12 generates the output signal 13 with a low level. In such a case, there arises the possibility that the clock-signal extracting circuit 14 extracts the clock-signal component from the output signal 13 with the low level. However, since the frequency of the tone-signal contained in the output signal 13 with the low level is outside of the passing-band of the BPF in the tone-signal extracting circuit 15, the output level of the tone-signal extracting circuit 15 becomes nearly equal to the noise level peculiar to the circuit.

That is to say, since the wavelength of the adjacent optical signal is different from the central wavelength of the optical BPF, the optical power arriving at the O/E converter 12 is considerably attenuated. Moreover, since the frequency of the tone-signal contained adjacent optical signal is in the outside of the passing-band of the tone-signal extracting circuit 15, the aforementioned tone-signal is attenuated yet once more, and its level becomes nearly equal to the noise level of the circuit.

As mentioned in the above, when the optical signal to be received is down, the signal level of the output signal 18 of the tone-signal extracting circuit 15 is nearly equal to the noise level and less than standard voltage 22, and the reset signal 23 is generated by the comparator 19 and supplied to the electrical signal decision circuit 16. Then, the electrical signal decision circuit 16 stops its operation for discriminating and regenerating the output signal of the O/E converter 12, even when the clock-signal 17 is supplied, and the output signal of the electrical signal decision circuit 16 vanishes. Accordingly, by detecting whether the tone-signal, which is superposed on the optical signal that is to be originally received, is present or not, the possibility that the optical signal other than the one to be received is misguidedly discriminated, regenerated and supplied to following stages is eliminated.

In the embodiment described in the above, the operation of the electrical signal decision circuit is stopped by supplying the reset signal generated by the comparator to the electrical signal decision circuit, when the tone-signal is not detected. However, the same object can be achieved by stopping the supply of the clock-signal generated by the clock-signal extracting circuit, when the tone-signal is not detected. The operation of the electrical signal decision circuit can be stopped by stopping the supply of the clock-signal thereto.

In the aforementioned embodiment, only the optical signals in the 1.5 μm-band are used, but the optical signals in the 1.3 μm-band or other bands of the wavelengths can be used. The numbers of multiplexes density and the spacing between the adjacent wavelengths of the optical signals are not restricted to those used in the aforementioned embodiment. Even in the case that the spacing between the wavelengths of the adjacent optical signals is so narrow that the level of the adjacent optical signal cannot be sufficiently attenuated by the optical BPF down to a level, on which the regeneration of the clock-signal peculiar to the adjacent optical signal is impossible, misguided receiving of the adjacent optical signal can be prevented by the aid of the detection of the levels of the tone-signals. Moreover, although, in the aforementioned embodiment, the frequencies of the tone-signals to be respectively superposed on the optical signals are allocated in a frequency range 30 KHz to 46 KHz at an interval of 2 KHz, the frequencies of the tone-signals are never restricted to the aforementioned frequencies. The frequencies of the tone-signals can be selected at will, so long as the interval of the neighboring frequencies of the tone-signals is so wide that the tone-signals of the adjacent optical signals can be sufficiently attenuated by the BPFs.

In the aforementioned embodiment, the frequency of the tone-signal is increased in regular sequence, as the wavelength of the optical signal is increased. However, the BPFs, characteristics of which are not so steep, can be used by increasing the interval of the frequencies of the tone-signals, which are superposed on the adjacent optical signals. For example, the tone-signals of 30 KHz, 34 KHz, 38 KHz, 32 KHz, and 36 KHz are respectively assigned to the optical signals with the wavelengths of 1548 nm, 1549 nm, 1550 nm, 1551 nm, and 1552 nm. According to the above mentioned assignment, the interval of the frequencies of the tone-signals of the adjacent optical signals can be made to be 4 KHz or the other value larger than 4 KHz, although the interval of the neighboring frequencies of the tone-signals is 2 KHz.

According to the inventions shown in the drawings, when the optical signal to be received is attenuated, the output level of the tone-signal extracting means becomes lower than that of the standard voltage. Then, the operation of the electrical signal decision circuit is stopped, even if the clock-signal component of the adjacent optical signal is extracted. Thereby, there is no possibility that the adjacent optical signal is misguidedly received.

According to the invention shown in claim 2, since the peak value of the tone-signal extracted by the BPF is regarded as the output signal of the tone-signal extracting means, this voltage can be easily compared with the standard voltage.

Although the invention has been described with respect to specific embodiment for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical receiving apparatus for receiving narrow band wavelength-division-multiplexed optical signals, which respectively have wavelengths that are approximate to each other, and are modulated by superposition of high bit-rate digital signals and low frequency tone-signals with different frequencies for identifying individual optical signals, comprising:

a plurality of optical filters respectively extracting plural individual optical signals from said wavelength-division-multiplexed optical signals, and a plurality of optical receivers corresponding to said individual optical signals, each of which comprises an optical to electrical signal converter for converting said individual optical signal into an electrical signal;

a clock-signal extracting circuit for extracting a clock-signal component from an output signal of said optical to electrical signal converter;

an electrical signal decision circuit for discriminating and regenerating said output signal of said optical to electrical signal converter, based on said clock-signal;

a tone-signal extracting circuit for extracting a tone-signal component from said output signal of said optical to electrical signal converter;

a comparator for comparing a level of said tone-signal with a predetermined standard voltage; and a reset signal for stopping an operation of said electrical signal decision circuit, when said comparator detects that said level of said tone-signal is lower than said predetermined standard voltage.

2. An optical receiving apparatus according to claim 1, wherein:

said tone-signal extracting circuit is composed of a cascade connection of an electrical band-pass-filter for extracting said tone-signal component from said output signal of said optical to electrical signal converter and peak detecting circuit for detecting a peak value of an output signal of said electrical band-pass-filter.

3. An optical receiving apparatus according to claim 1, wherein:

said reset signal for stopping said operation of said electrical signal decision circuit stops supply of said clock-signal to said electrical decision circuit, when said comparator detects that said level of said tone-signal is lower than said predetermined standard voltage.

4. An optical receiving apparatus according to claim 1, wherein:

said reset signal for stopping said operation of said electrical signal decision circuit is supplied to said electrical decision circuit, when said comparator detects that said level of said tone-signal is lower than said predetermined standard voltage.

* * * * *